United States Patent
Jones et al.

(10) Patent No.: US 11,062,276 B2
(45) Date of Patent: Jul. 13, 2021

(54) APPARATUS AND METHOD FOR REUSING CONTAINERS

(71) Applicant: Walmart Apollo, LLC, Bentonville, AR (US)

(72) Inventors: Nicholaus A. Jones, Fayetteville, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 443 days.

(21) Appl. No.: 15/802,361

(22) Filed: Nov. 2, 2017

(65) Prior Publication Data

US 2018/0130015 A1 May 10, 2018

Related U.S. Application Data

(60) Provisional application No. 62/418,579, filed on Nov. 7, 2016, provisional application No. 62/418,550, filed (Continued)

(51) Int. Cl.
*G06Q 10/00* (2012.01)
*G06F 16/28* (2019.01)
(Continued)

(52) U.S. Cl.
CPC .............. *G06Q 10/30* (2013.01); *B65B 1/385* (2013.01); *B65B 5/00* (2013.01); *B65B 57/04* (2013.01);
(Continued)

(58) Field of Classification Search
CPC ......... B65B 1/385; B65B 57/04; B65B 57/12; G06F 16/23; G06F 16/289;
(Continued)

(56) References Cited

U.S. PATENT DOCUMENTS

| 4,248,334 A | 2/1981 | Hanley |
| 4,248,389 A | 2/1981 | Thompson |

(Continued)

FOREIGN PATENT DOCUMENTS

| WO | 2009048227 | 4/2009 | |
| WO | WO-2010030713 A2 * | 3/2010 | ............. B65B 55/20 |
| WO | 2012006031 | 1/2012 | |

OTHER PUBLICATIONS

"Recycling sorting systems with conveyor belt," Aug. 8, 2020 (Year: 2020).*

(Continued)

*Primary Examiner* — George Chen
*Assistant Examiner* — Brian Adams Heflin
(74) *Attorney, Agent, or Firm* — Fitch, Even, Tabin & Flannery LLP

(57) ABSTRACT

Systems, apparatuses, and methods are provided herein for reusing containers. A system for container reuse comprises an order database storing a plurality of orders associated with an order fulfillment facility, a conveyor system, and a control circuit. The control circuit being configured to determine container capacity requirements of the plurality of orders in the order database based on dimensions of products in each order, predict container usage for fulfilling orders at the order fulfillment facility based at least on the container capacity requirements of the plurality of orders, determine whether a used container received at the conveyor system should be retained based on a container dimension of the used container and the container usage predicted for the order fulfillment facility, and cause the conveyor system to route the used container to a fulfillment area or a disposal area based on whether the used container should be retained.

20 Claims, 6 Drawing Sheets

Related U.S. Application Data on Nov. 7, 2016, provisional application No. 62/418,594, filed on Nov. 7, 2016.

(51) Int. Cl.

| | | |
|---|---|---|
| *B65B 1/38* | (2006.01) | |
| *B67C 7/00* | (2006.01) | |
| *G05B 23/02* | (2006.01) | |
| *B65G 1/137* | (2006.01) | |
| *G06Q 10/08* | (2012.01) | |
| *G06T 7/73* | (2017.01) | |
| *G06T 7/00* | (2017.01) | |
| *G06F 16/23* | (2019.01) | |
| *B65B 5/00* | (2006.01) | |
| *B65B 69/00* | (2006.01) | |
| *B65B 57/12* | (2006.01) | |
| *B65B 57/04* | (2006.01) | |
| *B65B 5/12* | (2006.01) | |
| *B65B 43/62* | (2006.01) | |

(52) U.S. Cl.
 CPC ............ *B65B 57/12* (2013.01); *B65B 69/00* (2013.01); *B65G 1/1373* (2013.01); *B67C 7/0053* (2013.01); *G05B 23/0297* (2013.01); *G06F 16/23* (2019.01); *G06F 16/289* (2019.01); *G06Q 10/083* (2013.01); *G06Q 10/087* (2013.01); *G06Q 10/0832* (2013.01); *G06T 7/0004* (2013.01); *G06T 7/74* (2017.01); *B65B 5/12* (2013.01); *B65B 43/62* (2013.01); *B65G 1/1376* (2013.01); *G05B 2219/40007* (2013.01)

(58) Field of Classification Search
 CPC ............ G06Q 10/0832; G06Q 10/087; G06Q 10/083; G03G 21/181; G05B 23/0297; G65B 57/04; G65B 57/12; B07C 5/34; B65B 1/1373; B65G 1/1376; G06T 7/0004; G06T 7/74
 USPC ........................................ 705/26.9
 See application file for complete search history.

(56) References Cited

U.S. PATENT DOCUMENTS

| | | | |
|---|---|---|---|
| 4,345,679 | A | 8/1982 | Dewoolfson |
| 4,919,534 | A | 4/1990 | Reed |
| 5,072,833 | A | 12/1991 | Hansen |
| 5,247,747 | A | 9/1993 | Grey |
| 5,829,229 | A | 11/1998 | Hyatt |
| 6,137,900 | A | 10/2000 | Steidel |
| 6,615,104 | B2 | 9/2003 | England |
| 6,634,506 | B2 | 10/2003 | Beal |
| 6,952,628 | B2* | 10/2005 | Prutu ............... B07C 1/10 198/572 |
| 6,988,079 | B1 | 1/2006 | Or-Bach |
| 7,419,058 | B2 | 9/2008 | Wening |
| 8,326,679 | B1 | 12/2012 | Rowe |
| 8,667,014 | B2 | 3/2014 | Zaengle |
| 8,849,724 | B2 | 9/2014 | May |
| 8,862,495 | B2 | 10/2014 | Ritter |
| 9,315,344 | B1* | 4/2016 | Lehmann ............ G06Q 10/08 |
| 1,580,235 | A1 | 11/2017 | Jones |
| 1,580,236 | A1 | 11/2017 | Jones |
| 10,668,506 | B2* | 6/2020 | Erden ............... B65G 47/82 |
| 2002/0095348 | A1 | 7/2002 | Hiroshige |
| 2002/0121521 | A1* | 9/2002 | Beal ............... B65D 11/18 220/529 |
| 2005/0046567 | A1 | 3/2005 | Mortenson |
| 2006/0206395 | A1* | 9/2006 | Vallabh ............ G06Q 10/08 705/26.1 |
| 2006/0221877 | A1 | 10/2006 | Belanger |
| 2007/0016538 | A1* | 1/2007 | Bielefeld ............ G06Q 10/08 705/410 |
| 2009/0007525 | A1 | 1/2009 | Lewis |
| 2010/0063887 | A1 | 3/2010 | Kranz |
| 2010/0153220 | A1 | 6/2010 | Hamm |
| 2010/0185506 | A1 | 7/2010 | Wolff |
| 2011/0119295 | A1 | 5/2011 | Zaengle |
| 2012/0004761 | A1 | 1/2012 | Madruga |
| 2012/0128240 | A1 | 5/2012 | Rothschild |
| 2013/0173487 | A1* | 7/2013 | May ............... G06Q 10/00 705/333 |
| 2013/0247519 | A1 | 9/2013 | Clark |
| 2013/0269298 | A1 | 10/2013 | Baltes |
| 2014/0289027 | A1 | 9/2014 | Hamm |
| 2015/0088767 | A1 | 3/2015 | Varadarajan |
| 2015/0324760 | A1* | 11/2015 | Borowski ............ B65F 1/10 705/308 |
| 2017/0225199 | A1* | 8/2017 | Koistinen ........... B65F 1/1484 |

OTHER PUBLICATIONS

Grover, Sami; "New Products in Old Boxes: Columbia Sportswear's Reuse Program"; http://www.treehugger.com/corporateresponsibility/ newproductsinoldboxescolumbiasportswearsreuseprogram.html; Sep. 24, 2009; pp. 1-3.

PCT; App No. PCT/US2017/058978; International Search Report and Written Opinion dated Jan. 18, 2018.

PCT; App. No. PCT/US2017/058945; International Search Report and Written Opinion dated Jan. 25, 2018.

PCT; App. No. PCT/US2017/059455; International Search Report and Written Opinion dated Jan. 8, 2018.

Savi; "Reusable Container Management"; http://www.savi.com/wpcontent/uploads/ SolutionsHighlights_ReusableContainers_Jan201411.pdf; Jan. 16, 2014; pp. 1-2.

\* cited by examiner

APPARATUS AND METHOD FOR REUSING CONTAINERS

CROSS-REFERENCE TO RELATED APPLICATIONS

This application claims the benefit of the following U.S. Provisional Application No. 62/418,579 filed Nov. 7, 2016, U.S. Provisional Application No. 62/418,550 filed Nov. 7, 2016, and U.S. Provisional Application No. 62/418,594 filed Nov. 7, 2016, which are all incorporated herein by reference in their entirety.

TECHNICAL FIELD

This invention relates generally to containers.

BACKGROUND

Containers are used for holding and transporting items between locations. The increasing popularity of home delivery shopping services also increases the volume of boxes used by retailers and customers.

BRIEF DESCRIPTION OF THE DRAWINGS

Disclosed herein are embodiments of apparatuses and methods for container management. This description includes drawings, wherein.

Figure 1:
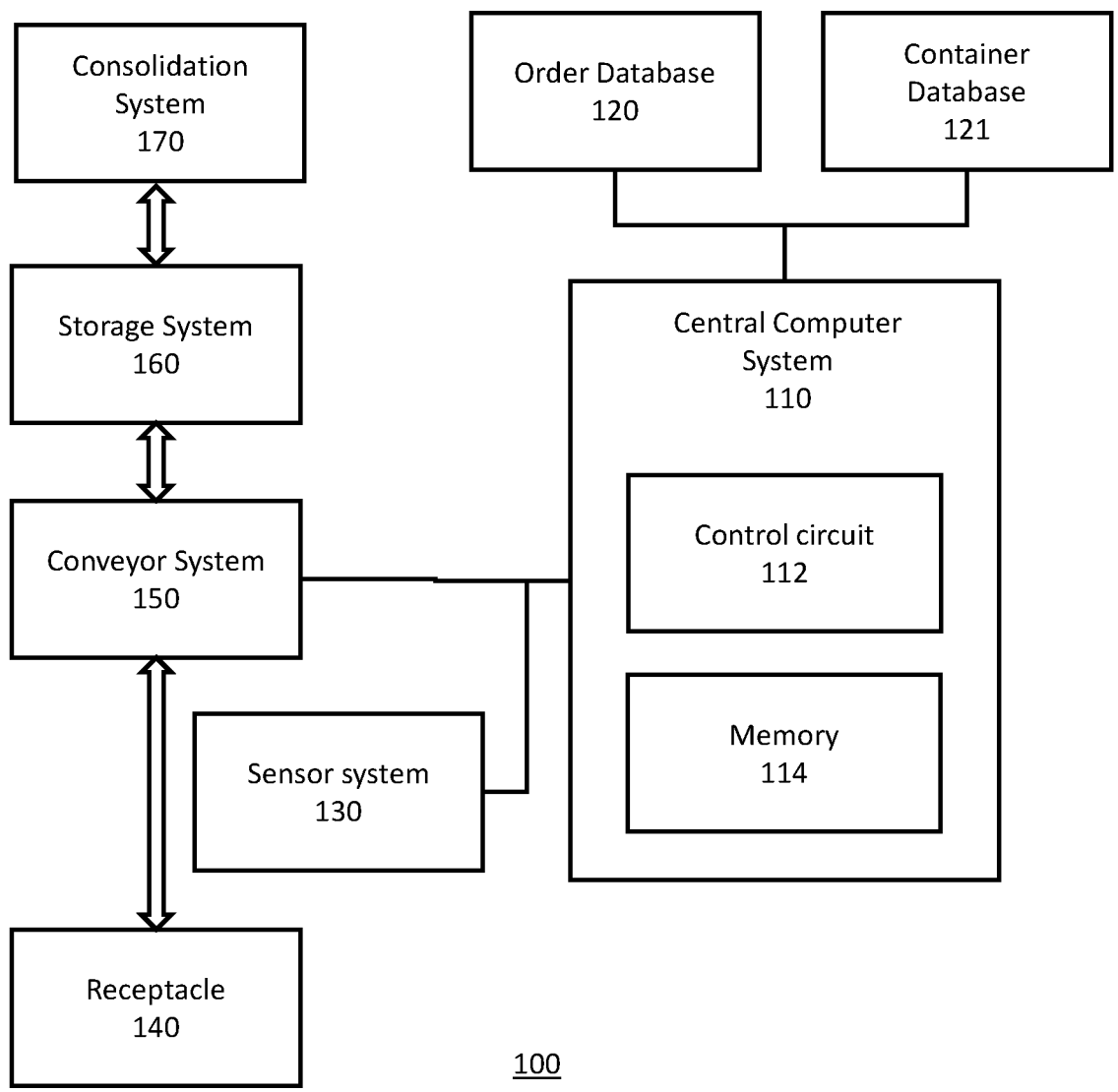
FIG. 1 comprises a block diagram of a system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for reusing containers. In some embodiments, a system for used container intake comprises a receptacle configured to receive used containers from customers, a sensor system configured to detect dimensions and conditions from containers placed in the receptacle, a used container database, a conveyor system, and a control circuit coupled to the sensor system and the used container database. The control circuit being configured to assign a container identifier to a container detected by the sensor system, measure a container dimension of the container with the sensor system, determine a container condition based on whether the container is suitable for reuse, associate the container dimension with the container identifier in the used container database, and cause the conveyor system to route the container based on the container condition.

In some embodiments, a system for container reuse comprises an order database storing a plurality of orders associated with an order fulfillment facility, a conveyor system, and a control circuit coupled to the order database. The control circuit being configured to determine container capacity requirements of the plurality of orders in the order database based on dimensions of products in each order, predict container usage for fulfilling orders at the order fulfillment facility based at least on the container capacity requirements of the plurality of orders, determine whether a used container received at the conveyor system should be retained based on a container dimension of the used container and the container usage predicted for the order fulfillment facility, and cause the conveyor system to route the used container to a fulfillment area or a disposal area based on whether the used container should be retained.

In some embodiments, a system for filling orders comprises an order database storing a plurality of orders, a used container database storing dimensions of a plurality of used containers, and a control circuit coupled to the order database and the used container database. The control circuit being configured to: determine a container requirement of an order in the order database based on dimensions of products in the order, determine whether an available used container in the used container database meets the container requirement of the order, in an event that an used container meets the container requirement of the order, assign the used container to the order, and in an event that no available used container meets the container requirement of the order, select a new container for the order.

Referring now to FIG. 1, a system for reusing containers is shown. The system 100 comprises a central computer system 110, a container database 121, an order database 120, a sensor system 130, a container receptacle 140, a conveyor system 150, a storage system 160, and a consolidation system 170. In some embodiments, one or more of the sensor system 130, the receptacle 140, the conveyor system 150, the storage system 160, and the consolidation system 170 may be located at a retail facility and/or an order fulfillment facility.

The central computer system 110 comprises a control circuit 112 and a memory 114. The central computer system 110 may comprise one or more of a local computer system, a facility management computer system, an order fulfillment system, a remote server, a cloud-based server, and the like. In some embodiments, the central computer system 110 may comprise a system located at a retail and/or fulfillment facility in which the used containers are handled. In some embodiments, the central computer system 110 may comprise a system remote to the facility.

The control circuit 112 may comprise a processor, a microprocessor, and the like and may be configured to execute computer readable instructions stored on a computer readable storage memory 114. The computer readable storage memory 114 may comprise volatile and/or non-volatile memory and have stored upon it, a set of computer readable instructions which, when executed by the control circuit 112, causes the central computer system 110 to collect information from used containers received at the receptacle 140 with the sensor system 130, sort the containers based on the detected information, and use the used containers to fill orders in the order database 120. In some embodiments, the central computer system 110 may further be configured to update container information in the container database 121 based on information detected by the sensor system 130. In some embodiments, the control circuit 112 may be configured to perform one or more steps described with reference to FIGS. 2-4 and 6-7 herein.

The central computer system 110 may be coupled to the order database 120 and/or the container database 121 via wired and/or wireless data connections. In some embodiments, one or more of the order database 120 and the container database 121 may be implemented on the memory 114 of the central computer system 110 and/or another computer readable memory storage device. The order database 120 may be configured to store a plurality of customer orders. In some embodiments, each order record may specify one or more items to be tendered to the customer. In some embodiments, the order records may further comprise other information such as customer information, customer address, order delivery method, customer preference, etc. In some embodiments, the orders in the order database 120 may comprise one or more of a delivery order, an in-store pickup order, a curb-side pick-up order, a recurring order, and a "click-less commerce" order comprising items not specifically selected by customers. In some embodiments, the order database 120 may comprise database structure that associates customer orders identifiers with ordered items and/or other order information.

The container database 121 may be configured to store container information associated with a plurality of used and/or new containers. In some embodiments, containers may refer to any portable container suited for holding items to transfer to customers. In some embodiments, a container may comprise one or more of a box, a cardboard box, a plastic box, a bin, a basket, a tote, a crate, and the like. In some embodiments, containers associated with information stored in the container database 121 may comprise containers dropped off by a customer, containers used to transport products to the facility, and/or new containers. In some embodiments, the container database 121 may further store detected locations of markings on the container for a labeling system to cover up the markings. In some embodiments, the container database 121 may store information (e.g. associated seller, associated shipping company, product, etc.) determine based on the markings on the containers for market analytics. For example, the system may estimate where their customers shop based on the used containers. In some embodiments, the container database 121 may further store statuses for one or more used containers such as the current location of the container, whether the container is assigned to an order, and whether the container has been used to fill an order. In some embodiments, the container database 121 may comprise database structure that associates a unique container identifier with the container's dimension, capacity, condition, location, markings, and/or status.

The receptacle 140 may comprise an apparatus for receiving used containers. In some embodiments, the receptacle 140 may comprise one or more of a window, a container, a slot, a chute, a bin, a platform, a conveyor belt, and the like. In some embodiments, the receptacle 140 may comprise a portion of the conveyor system 150. In some embodiments, the receptacle 140 may be located inside or outside of a retail and/or fulfillment facility. For example, the receptacle 140 may comprise opening on an exterior wall of a retail facility where customers can drive up and drop off used containers. In some embodiments, the receptacle 140 may be located in the fulfillment and/or storage area of a facility for facility associates to deposit containers used to ship items to the facility. In some embodiments, the receptacle 140 may comprise a user interface configured to provide customers incentives (e.g. cash back, store credit, coupon) for deposited containers. In some embodiments, the incentive may be determined based on the container condition, dimension, and/or type as determined based on the sensor system 130.

The sensor system 130 may comprise one or more sensors configured to collect data from containers. In some embodiments, the sensor system 130 may be position in or over the receptacle 140 and/or be located further down the conveyor system 150. In some embodiments, the sensor system 130 may comprise one or more of a camera, an optical sensor, a laser distance sensor, a range sensor, and the like. In some embodiments, the receptacle 140 and/or a conveyor system 150 may comprise a sizing grid and the sensor system 130 may be configured to capture an image of the container with the size grid to determine the dimension of the container. In some embodiments, the information detected by the sensor system may further be used to determine the condition of the container. For example, image analysis may be used to determine if a box is dented, broken, wet, and/or soiled. In some embodiments, the sensor system 130 may further detect for markings on the container such as shipping labels and logos. Locations of the markings detected by the sensor system 130 may be provided to a labeling system to cover up the markings. In some embodiments, the labeling system may be configured to label containers with one or more of a container identifier, a container dimension indicator, and a container condition indicator.

The conveyor system 150 may comprise one or more object conveyor devices such as one or more of an automated conveyor system, conveyor belts, mechanical arms, motorized movable units, unmanned motored units, push-carts, etc. for moving and sorting containers received from the receptacle 140. In some embodiments, the conveyor system 150 may comprise a processor-based computer system configured to convert instructions received from the central computer system 110 to instructions for one or more conveyor devices and/or associates to move and sort used containers. In some embodiments, the conveyor system 150 may be configured to route used containers from the receptacle 140 to one or more of the storage system 160, a disposal area, a recycling area, and the consolidation system 170. In some embodiments, the conveyor system 150 may further be configured to transport containers between and/or within the storage system 160 and the consolidation system 170.

The storage system 160 may generally be configured to hold a plurality of containers in storage before the containers are used to fill an order. In some embodiments, the storage system 160 may comprise one or more storage shelves, bins, cases, and the like. In some embodiments, the storage system 160 may be configured to hold containers in their uncollapsed form. For example, a cardboard box may be stored in the storage system without being flattened. In some embodiments, the storage system 160 may comprise container sensors, such as optical sensors, for keeping track of containers stored in the storage system 160. In some embodiments, the storage system 160 may further comprise sensors similar to the sensor system 130 for determining the size and/or condition of the used containers stored in the system. The container storage locations tracked by the storage system 160 may be communicated to the central computer system 110 and/or the container database 121 to update container information in the container database 121. In some embodiments, the storage system 160 may comprise only storage structures; container locations and conditions may be tracked by the central computer system 110. In some embodiments, the storage system 160 may comprise visual indicators configured to indicate a storage location of used containers selected for specific orders. For example, one or more shelf spaces and/or racks may comprise a light that turns on to indicate the location a used container selected for an order being filled by an associate. The associate filling an order may then go to the indicated storage space to retrieve the selected container. In some embodiments, the storage system 160 may comprise a container mover device configured to move the container selected for the order from a storage location of the container to an item consolidation area for order fulfillment. In some embodiments, the system 100 may further comprise a container sorter configured to arrange at least some of the plurality of used containers based on a fulfillment sequence of orders assigned to each of the at least some of the plurality of used containers. In some embodiments, the sorter may arrange the containers as they enter the storage system and line the containers up in a queue. In some embodiments, the sorter may be configured to move the used containers to a consolidation system 170 and cause containers to arrive at one or more consolidation stations according to the orders assigned to each consolidation station.

The consolidation system 170 generally refers to a system configured to consolidate products for customer orders. The system may cause used containers assigned to customer orders to be transferred and/or carried to the consolidation system 170 for filling orders. In some embodiments, used containers may be retrieved from the storage system 160 for use in the consolidation system 170. In some embodiments, the conveyor system 150 may be configured to directly transfer a used container from the receptacle 140 to the consolidation system 170 without storing the container in the storage system 160. In some embodiments, the consolidation system 170 may comprise consolidation stations and/or user interface devices configured to provide order fulfillment instructions to associates to fill selected containers with products in customer orders. In some embodiments, the consolidation system 170 may comprise a conveyor system and/or automated movable units configured to at least partially automate the collection of products from a product storage area. In some embodiments, the product storage area may be separated from or share space with the storage system 160 configured to store containers. In some embodiments, the consolidation system 170 may be configured to fill containers for one or more of in-store pickup orders, curbside pickup orders, delivery orders, and reoccurring orders.

In some embodiments, one or more of the sensor system 130, the receptacle 140, the conveyor system 150, the storage system 160, and the consolidation system 170 may comprise a processor-based control system having a control circuit configured to execute computer readable instructions stored on a memory. While the central computer system 110 is shown to communicate with the conveyor system 150 and the sensor system in FIG. 1, the central computer system 110 may provide instructions and receive information from one or more of the sensor system 130, the receptacle 140, the conveyor system 150, the storage system 160, and the consolidation system 170. In some embodiments, the control system of one or more of the sensor system 130, the receptacle 140, the conveyor system 150, the storage system 160, and the consolidation system 170 may be at least partially implemented with the central computer system 110. In some embodiments, the central computer system 110 may further be coupled to an ordering and payment processing system for receiving customer orders and processing customer payments for one or more items via one or more of bank card payment, digital currency payment, cash payment, retailer credit system payment, and mobile payment. In some embodiments, the system 100 may further comprise a label system configured to label received containers based on information detected by the sensor system (e.g. dimension, size) and/or orders assigned to the container. In some embodiments, the system 100 may further comprise a container sorter to route received used containers to different areas such as the consolidation system 170, the storage system 160, a recycling area, and/or a disposal area. In some embodiments, one or more components of the system 100 shown in FIG. 1 may communicate with another component via one or more of wired connections, wireless communication channels, a private network, a local network, a peer-to-peer network, and the Internet.

Figure 2:
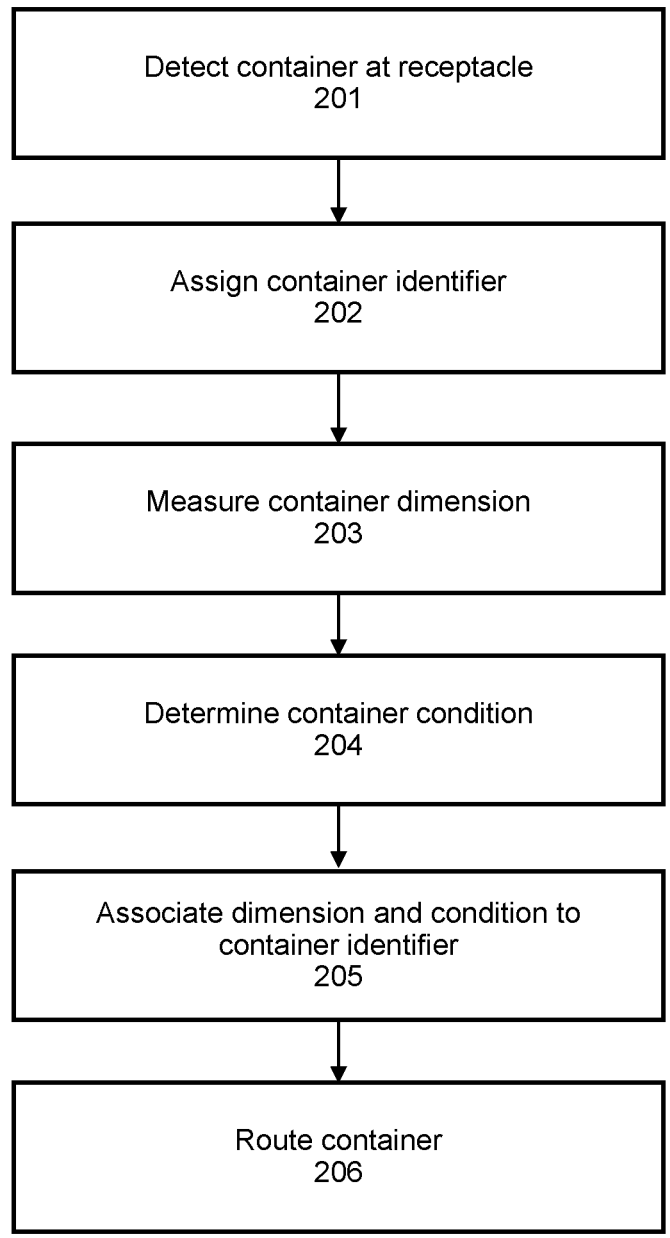
FIG. 2 comprises a flow diagram of a method as configured in accordance with various embodiments of these teachings.

Referring now to FIG. 2, a method for used container intake is shown. In some embodiments, the steps shown in FIG. 2 may be performed by a processor-based device such as a control circuit executing a set of computer readable instructions stored on a computer readable memory. In some embodiments, one or more steps of FIG. 2 may be performed by one or more of the control circuit 112 of the central computer system 110, a control circuit of the sensor system 130, the receptacle 140, the conveyor system 150, the storage system 160, and/or the consolidation system 170 described with reference to FIG. 1 herein.

In step 201, the system detects a container at a receptacle. In some embodiments, the receptacle may comprise an apparatus configured to receive used containers. In some embodiments, the container may comprise one or more of a box, a cardboard box, a plastic box, a bin, a basket, and a tote. In some embodiments, the container may comprise a container dropped off by a customer or a container used to transport products to the facility. In some embodiments, the receptacle may comprise one or more of a window, a container, a slot, a chute, a bin, a platform, a conveyor belt, and the like. In some embodiments, the receptacle may comprise a portion of the conveyor system. In some embodiments, the receptacle may be located inside or outside of a retail and/or fulfillment facility. In some embodiments, the receptacle may comprise the receptacle 140 described with reference to FIG. 1, the container receptacle 513 described with reference to FIG. 5 or a similar device. In some embodiments, the container may be detected by a sensor system comprising one or more of an optical, weight, and/or range sensor. In some embodiments, the sensor system for detecting the container may comprise the sensor system 130 described with reference to FIG. 1, the sensor system 515 described with reference to FIG. 5, or a similar device. In some embodiments, the receptacle may comprise a mechanical lever or a switch configured to be actuated by the container and/or a person depositing the container to notify the system that a container has been deposited.

In step 202, the system assigns a container identifier to the container detected by the sensor system. In some embodiments, the container identifier may comprise a unique identifier for a particular container and/or may be selected based on container type and/or size.

In step 203, the system measures the container dimension of the container with the sensor system. In some embodiments, a sensor system for measuring the dimension of the container may be positioned in or over a receptacle and/or be located further down a conveyor system. In some embodiments, the sensor system may comprise one or more of a camera, an optical sensor, a laser distance sensor, and a range sensor. In some embodiments, the receptacle and/or the conveyor system may comprise a size grid and the sensor system may be configured to capture an image of the container next to the size grid to determine the dimension of the container. In some embodiments, the sensor system may comprise range sensors for measuring the distance between the sensor and one or more sides of the container to determine the dimension of the sensor. In some embodiments, the dimension of the container may comprise physical measurements such as one or more of width, height, length, volume, capacity, and the like.

In step 204, the system determines a container condition. In some embodiments, the system determines the container condition based on whether the container is suitable for reuse and/or recycle. In some embodiments, image analysis may be used to determine if a container is dented, broken, wet, and/or soiled. In some embodiments, the system may determine the container condition based on detecting for straight lines in the shape of the container that may indicate damages to the container. In some embodiments, the system may be configured to determine the container condition by detecting for discolorations in an image of the container. In some embodiments, the system may assign a condition tag to a container comprising one or more of reusable, recyclable, and landfill based on the condition of the container detected by the sensor system.

In some embodiments, the system may further determine a container type based on the information collected by the sensor system. For example, the system may determine whether the container comprises a cardboard box, a plastic box, a basket, a tote, or a bag based on one or more of container appearance, container color, container weight, and/or container shape. In some embodiments, after step 204, the sensor system may further detect for markings on the container such as shipping labels and logos of other companies. In some embodiments, the system may be configured to locate a logo and/or a shipping label on the container; and cause the labeling system to apply a covering over the logo and/or the shipping label on the container. In some embodiments, the system may be configured to locate the markings based on comparing an image of the container with a logo database storing images of a plurality of logos. In some embodiments, the labeling system may be configured to apply one or more of a container identifier, a container dimension indicator, and a container condition indicator to the container based on the information collected by the sensor system. In some embodiments, the system may assign a customer order to the container after step 204 and the labeler may cover up the marking with a label that includes order and/or customer information.

In step 205, the system associates the container dimension with the container identifier in a used container database. In some embodiments, the system may only store dimension information of containers that are determined to be reusable in step 204. In some embodiments, the system may further associate the condition of the container determined in step 204 with the container identifier.

While steps 202-204 are shown sequentially, in some embodiments, steps 202-204 may occur simultaneously and/or in any order. For example, the same set of sensor data may be used to determine container dimension in step 203 and container condition in step 204. In another example, step 202 may occur after steps 203 and 204 and container identifiers may only be assigned to containers that are determined to be reusable and/or routed to a storage or a consolidation system.

In step 206, the system causes a conveyor system to route the container based on the container condition determined in step 204. In some embodiments, the container condition may comprise one or more of landfill, recyclable, and reusable. In some embodiments, the conveyor system may be configured to route the container to one or more of a storage area, a consolidation area, a disposal area, and a recycling area based on the container condition. In some embodiments, the conveyor system may comprise the conveyor system 150 described with reference to FIG. 1 or a similar system. In some embodiments, the system may provide routing instructions to an associate and/or an automated movable unit to transport to containers to an assigned area. In some embodiments, the system may further be configured to determine whether the container will be used or will likely be used to fill an order and route the container accordingly. For example, after determining that the container is in a reusable condition, the system may determine that the container's dimension is not likely to match with customer orders and still route the container to recycling in step 205. In some embodiments, the container is transported in an uncollapsed state on the conveyor system. In some embodiments, the container may be transferred to a consolidation system or a storage system and eventually used to fill an order without being collapsed. In some embodiments, a container routed to a recycling and/or disposal area may be collapsed for recycling and/or disposal.

In some embodiments, steps 201-205 may be repeated for each container detected at the receptacle. In some embodiments, multiple instances of the process shown in FIG. 2 may simultaneously occur for a plurality of used containers.

Figure 3:
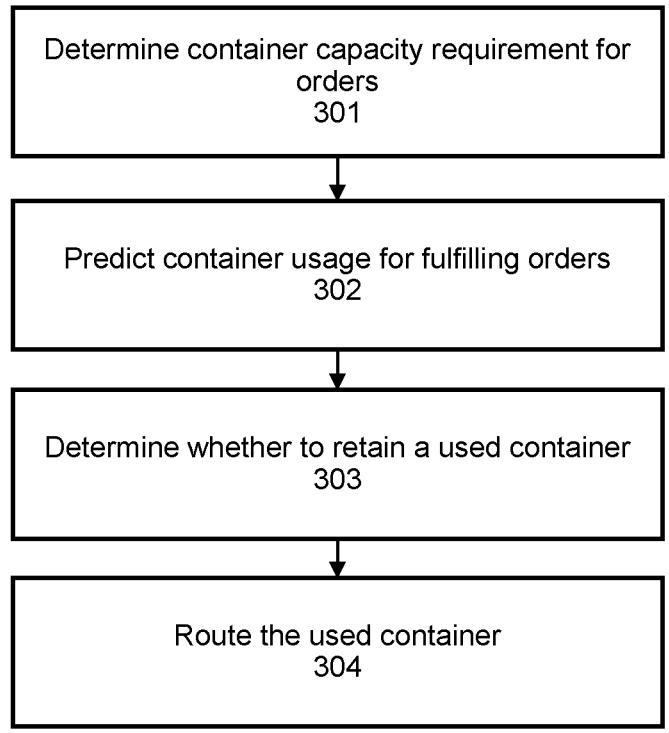
FIG. 3 comprises a flow diagram of a method as configured in accordance with various embodiments of these teachings.

Referring now to FIG. 3, a method for managing used containers is shown. In some embodiments, the steps shown in FIG. 3 may be performed by a processor-based device such as the control circuit executing a set of computer readable instructions stored on a computer readable memory. In some embodiments, one or more steps of FIG. 3 may be performed by one or more of the control circuit 112 of the central computer system 110, a control circuit of the sensor system 130, the receptacle 140, the conveyor system 150, the storage system 160, and/or the consolidation system 170 described with reference to FIG. 1 herein. In some embodiments, steps 301-303 may occur after or in parallel with step 204 described with reference to FIG. 2.

In step 301, the system determines container capacity requirements of a plurality of orders. In some embodiments, the plurality of orders may be stored in an order database storing orders associated with one or more order fulfillment facility. In some embodiments, the container capacity requirements may be determined based on dimensions of products in each order. In some embodiments, product dimensions may be stored in an inventory and/or product database. In some embodiments, capacity requirements for an order may further be determined based on whether the items require cushioning material and/temperature insulating material for transport. In some embodiments, the container capacity requirement may be determined based on one or more of the longest length of the items in an order, the total volume of the items in the order, a system simulated item stack, etc.

In step 302, the system predicts container usage for fulfilling orders at the order fulfillment facility. In some embodiments, the container usage for the order fulfillment facility may be predicted based on one or more of the plurality of orders in the order database, a history of past orders, and predicted further orders. In some embodiments, container usage may be predicted based at least on the container capacity requirements of the plurality of existing orders. In some embodiments, the system may aggregate the container capacity requirements for a plurality of orders in an order database to predict the need for different container sizes for filling existing orders. In some embodiments, the system may further predict container usage for future orders not yet received from customers. For example, the system may be configured to estimate future orders based on one or more of past orders, upcoming holidays, upcoming events, etc. and match containers to predicted further orders. In some embodiments, the system may group container into a number of size groups and estimate the number of containers needed in each group. In some embodiments, the system may use historical container usage data to predict future container usage for an associated time period (e.g. holiday shopping season, back-to-school season, etc.). For example, if the holiday season typically sees a 50% increase in orders, the system may estimate that the container usage may also increase approximately 50%.

In step 303, the system determines whether a used container received at a conveyor system should be retained based on the container dimension of the used container and the container usage predicted for the order fulfillment facility. In some embodiments, whether the used container should be retained may be determined based on matching the used container to an order in the order database. In some embodiments, whether the used container should be retained may be determined based on past usage rates of containers with dimensions similar to the used container. In some embodiments, whether the used container should be retained may be determined further based on one or more of current container inventory in a storage system and a current storage capacity of the facility. In some embodiments, the system may assign orders in the order database to containers in a container database in step 303, and retain all containers assigned to an order. In some embodiments, the system may determine to recycle or depose of containers that do not match an existing order and/or have a low likelihood of being used for a future order in step 303. In some embodiments, the system may be configured to maintain a set quantity of used containers in each size group in the storage system. If adding a container to the system will exceed the set number for a size group, the system may mark the container for disposal.

In step 304, the system routes the used container based the determination in step 303. In some embodiments, the system may cause a conveyor system to route the used container to a fulfillment area or a disposal area based on whether the used container should be retained. In some embodiments, the conveyor system may comprise the conveyor system 150 described with reference to FIG. 1 or a similar system. In some embodiments, the system may provide routing instructions to an associate and/or an automated movable unit to transport to containers to an assigned area. In some embodiments, the disposal area may comprise one or more of a recycling area and a landfill disposal area. In some embodiments, the fulfillment area may comprise one or more of a container storage area, a container sorting area, and an order consolidation area. In some embodiments, the fulfillment area may comprise the consolidation system 170 described with reference to FIG. 1 herein or a similar system. In some embodiments, the container storage area may comprise the storage system 160 described with reference to FIG. 1 herein or a similar system.

In some embodiments, the system may be configured to assign at least some orders in the order database to at least one container routed to the fulfillment and/or storage area. In some embodiments, the system may further determine a storage arrangement for a plurality of containers routed to the fulfillment area based on a fulfillment sequence of orders assigned to each of the plurality of containers. In some embodiments, the system may determine the storage arrangement for a plurality of containers routed to the storage area based on the dimensions and/or characteristics of each of the plurality of containers. For example, containers may be sorted based on size, weight, material, etc. In some embodiments, the containers may be arranged such that smaller containers are stored inside larger containers. In some embodiments, the system may arrange for smaller containers to be stored inside larger containers if an order assigned to the smaller container is scheduled to be filled before an order assigned to the larger container. In some embodiments, the system may be configured to select a storage location for the used container and associate the storage location with the used container identifier of the used container in a used container database. The system may then use the container storage location information in the used container database to generate container retrieval and/or order fulfillment instructions. In some embodiments, the used containers routed to the fulfillment and/or storage areas remain in an un-collapsed state and used containers routed to the disposal area are broken down for recycling or landfill.

In some embodiments, the steps of FIG. 3 may be repeated periodically and/or be triggered when used containers are received by the system. In some embodiments, steps 301 and 302 may be repeated periodically and steps 303 and 304 may be repeated each time a used container is received at the system.

Figure 4:
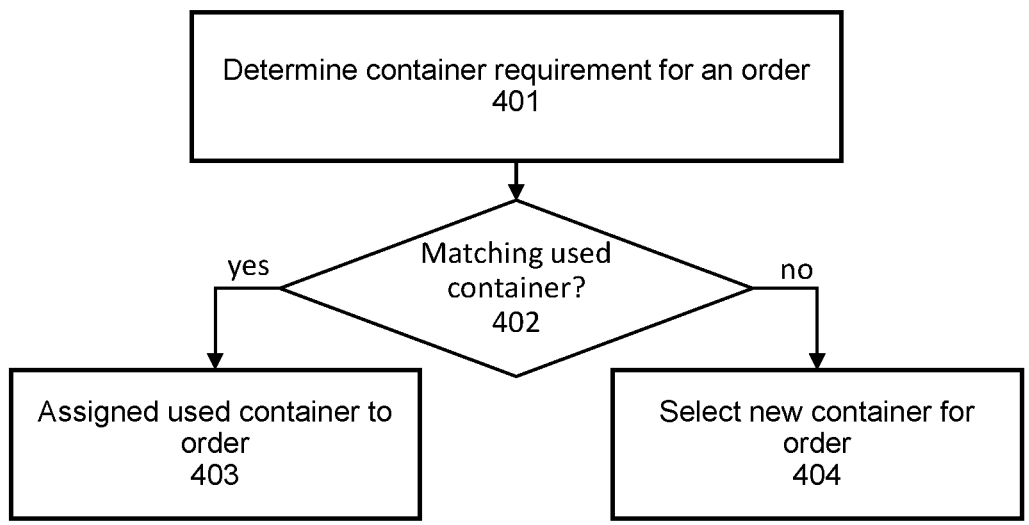
FIG. 4 comprises a flow diagram of a method as configured in accordance with various embodiments of these teachings.

Referring now to FIG. 4, a method for filing orders with used containers is shown. In some embodiments, the steps shown in FIG. 4 may be performed by a processor-based device such as the control circuit executing a set of computer readable instructions stored on a computer readable memory. In some embodiments, one or more steps of FIG. 4 may be performed by one or more of the control circuit 112 of the central computer system 110, a control circuit of the sensor system 130, the receptacle 140, the conveyor system 150, the storage system 160, and/or the consolidation system 170 described with reference to FIG. 1 herein. In some embodiments, steps 301 and 303 may occur after or in parallel with step 303 described with reference to FIG. 3.

In step 401, the system determines the container requirement of an order. In some embodiments, the order may comprise a customer product order stored in an order database. In some embodiments, the container requirement may be determined based on dimensions of products in the order. In some embodiments, product dimensions may be stored in an inventory and/or product database of the system. In some embodiments, the container requirement of an order may comprise one or more of a minimal container dimension, a maximum container dimension, a container type, a container weight capacity, etc. In some embodiments, container requirement may further be determined based on whether the items in the order require cushioning material and/or temperature insulating material for transport. In some embodiments, the container requirement may be determined based on the longest length of the items in an order, the total volume of the items in the order, a system simulated item configuration, etc. In some embodiments, the container requirement may further be determined based on order type (e.g. store pick-up, delivery, etc.), content property (e.g. frozen, perishable, fragile), and content weight. For example, a tote or a basket may be used for an in-store pickup order but a sealable container may be required for postal delivery. In some embodiments, capacity requirements for an order may be determined after products are picked from a storage area for an order. For example, the products may first be placed in a temporary container and the system may use a product dimension sensor to measure the dimensions of products in the temporary container to determine the order's transport container requirement.

In step 402, the system determines whether an available used container in the system meets the container requirement of the order. In some embodiments, information on used container may be retrieved from a used container database storing dimensions of a plurality of used containers. In some embodiments, the container dimensions may be determined in step 204 of FIG. 2. In some embodiments, the storage system may comprise a sensor system configured to measure dimensions of used containers in the storage system. In some embodiments, the used container database may further store the availability status of one or more containers (e.g. used, assigned to an order, available, etc.).

If a used container meets the container requirement of the order, in step 403, the system assigns the used container to the order. In some embodiments, the system may assign a used container to an order by associating the order to a used container in the used container database and/or associating a used container to an order in the order database. In some embodiments, at least some of the plurality of used containers are stored in a storage system. In some embodiments, the used containers are stored in an un-collapsed state in the storage system. For example, cardboard boxes may be stored without being flattened. In some embodiments, the used container database may record storage locations of the plurality of used containers. In some embodiments, the storage locations of used containers may be recorded in the used container database in step 206 described with reference to FIG. 2 and/or step 304 described with reference to FIG. 3.

If no available used container meets the container requirement of the order, in step 404, the system selects a new container for the order. In some embodiments, new containers may comprise containers that have not been previously used to transport items. In some embodiments, new containers may comprise one or more groups of identical containers. In some embodiments, new containers may be stored in a storage system in a collapsed and/or un-collapsed state. In some embodiments, one or more new containers may require some assembly (e.g. gluing/taping) before they can be used as a container for customer orders In some embodiments, the storage system for new and/or used containers may comprise indicators configured to indicate a storage location of the new and/or used container selected for an order. For example, a consolidation system may display an order on a user interface device and cause a LED light on the storage system to indicate the storage location for the container assigned to that order. In another example, the storage system may comprise a pusher device configured to push the selected container forward from the storage location. In some embodiments, the storage system may comprise a container mover device configured to move the new and/or used container selected for the order from a storage location of the container. In some embodiments, the system may use the container location information stored in the used container database to direct associates to the assigned container and/or to cause a conveyor system to transport the container to the consolidation area. In some embodiments, the system may further instruct a container sorter to arrange at least some of the plurality of used containers based on a fulfillment sequence of orders assigned to each of the at least some of the plurality of used containers. In some embodiments, the fulfillment sequence of orders may be determined by the system based on factors such as when the orders are placed, the scheduled delivery times of orders, and/or truck loading orders of orders. In some embodiments, a container sorter may further be configured to arrange new containers along with used containers based on the fulfillment sequences of orders assigned for each container.

In some embodiments, after steps 403 and/or 404, the system may further cause a labeling system to apply a label associated with the order to the used container or the new container selected for the order. In some embodiments, the label may comprise the customer's delivery and/or pickup information. In some embodiments, the labeling system may further be configured to print out a list of items in the order such as a packing or shipping list. In some embodiments, the labeling system may be configured to detect for markings on the used container such as shipping labels and logos of other companies. The labeling system may then apply a label or other coverings over the markings on the used container.

In some embodiments, after steps 403 and/or 404, the system may further cause a consolidation system to consolidate items in the order into the used container or the new container selected for the order. In some embodiments, the consolidation system may comprise user interface devices configured to provide order fulfillment instructions to associates and/or consolidation stations for associates to fill selected containers with products in customer orders. In some embodiments, the consolidation system may comprise a conveyor system configured to at least partially automate the collection of products from a product storage area. In some embodiments, the product storage area may be separated or with shared with the storage system configured to store used containers. In some embodiments, the consolidation system may be configured to fill containers for one or more of in-store pickup orders, curbside pickup orders, delivery orders, and reoccurring orders.

In some embodiments, the steps in FIG. 4 may be repeated for each order in an order database. In some embodiments, in step 402, if an order is not matched with a used container on-hand, the order may be marked as unassigned in the order database. In some embodiments, steps 401-402 may be repeated with the unassigned orders in the order database when one or more used containers are received at the system. In some embodiments, the process may proceed to step 404 if the order remains unassigned to a used container and is scheduled to be filled within a set amount of time (e.g. 3 hours, 1 hour, 30 minutes, etc.). In some embodiments, used containers may first be collected without being assigned to orders and steps 401-404 may only be performed when an order is scheduled to be filled within a set amount of time. In some embodiments, the system may assign used containers to orders as soon as they are received.

Figure 5:
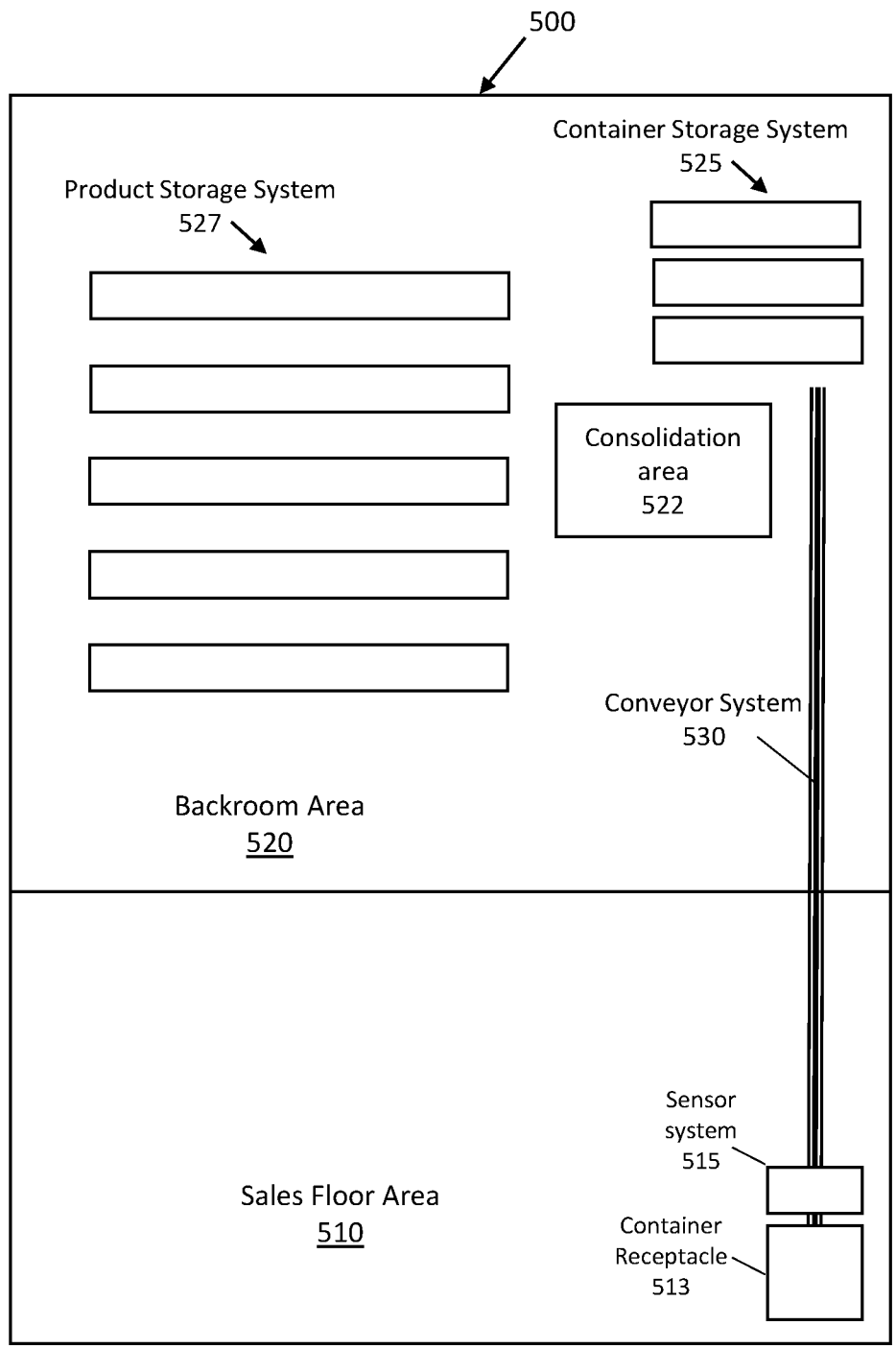
FIG. 5 comprises an illustration of a facility as configured in accordance with various embodiments of these teachings.

Referring now to FIG. 5, an illustration of a facility is shown. The facility 500 comprises a backroom area 520, a sales floor area 510, and a conveyor system 530. In some embodiments, the facility may comprise one or more of a retail facility, a shopping facility, a fulfillment facility, a distribution facility, a storage facility, and the like.

In some embodiments, the conveyor system 530 is coupled to a container receptacle 513 and a sensor system 515 and is configured to transport used containers deposited at the container receptacle 140. In some embodiments, the conveyor system 530, the container receptacle 513, and the sensor system 515 may comprise the conveyor system 150, the receptacle 140, and the sensor system 130, respectively, as described with reference to FIG. 1 herein or similar devices.

The container receptacle 513 may generally comprise an apparatus for receiving used containers. In some embodiments, the container receptacle 513 may comprise one or more of a window, a container, a slot, a chute, a bin, a platform, a conveyor belt, and the like. In some embodiments, the container receptacle 513 may comprise a portion of the conveyor system 530. While, in FIG. 5, the container receptacle 513 is shown to be in the sales floor area 510, in some embodiments, the container receptacle 513 may be located inside or outside of a retail and/or fulfillment facility. For example, the container receptacle 513 may comprise an opening on an exterior wall of the facility 500 where customers can drive up and deposit used containers. In some embodiments, a container receptacle 513 may be positioned in the backroom area 520 of the facility for receiving containers used to ship products to the facility 500.

The sensor system 515 may comprise one or more sensors configured to collect data from containers deposited into the receptacle. In some embodiments, the sensor system 515 may comprise one or more of a camera, an optical sensor, a laser distance sensor, and a range sensor. In some embodiments, the container receptacle 513 and/or a conveyor system 530 may comprise a size grid and the sensor system 515 may be configured to capture an image of the container next to the size grid to determine the dimension of the container. In some embodiments, the information detected by the sensor system 515 may further be used to determine a condition of the container. For example, image analysis may be used to determine if a box is dented, broken, wet, and/or soiled. While the sensor system 515 is shown to be adjacent to the container receptacle 513 in FIG. 5, in some embodiments, the sensor system 515 may be position in or over a container receptacle 513 and/or be located further down the conveyor system 530. In some embodiments, the sensor system 515 may comprise a plurality of sensor device positioned at one or more of the container receptacle 513, the conveyor system 530, the container storage system 525, and the consolidation area 522. In some embodiments, a sensor system 515 and/or a container receptacle 513 may be located in the backroom area 520 of the facility for associates to deposit containers used to transport products to the facility 500. For example, when products are removed from boxes to fill the product storage system 527 and/or in the consolidation area 522, the emptied boxes may be reused by the system.

The conveyor system 530 may comprise one or more object conveyor devices such as one or more of an automated conveyor system, conveyor belts, mechanical arms, motorized movable units, unmanned motored units, push-carts, etc. for moving and sorting containers received at the container receptacle 513. In some embodiments, the conveyor system 530 may be configured to route used containers from the container receptacle 513 to one or more of the container storage system 525, the consolidation area 522, a disposal area, and a recycling area. In some embodiments, the conveyor system 530 may further be configured to transport containers between and/or within the container storage system 525 and the consolidation area 522. In some embodiments, the conveyor system 530 may comprise a sorter for routing used containers and/or arranging containers on the conveyor system. In some embodiments, the conveyor system 530 or a separate conveyor system may be configured to consolidate products from the product storage system 527 for order fulfillment. While a straight conveyor line is shown in FIG. 5, in some embodiments, the conveyor system 530 may comprise a plurality segments and/or a plurality branches for routing containers to and from different areas. In some embodiments, the facility 500 may include a plurality of container receptacles 513, the sensor systems 515, and/or conveyor systems 530.

In some embodiments, the backroom area 520 may comprise an area that is generally inaccessible to customers of the facility 500. In some embodiments, the backroom area 520 may comprise a product storage system 527, a container storage system 525, and a consolidation area 522. The product storage system 527 may comprise storage apparatuses such as shelves, bins, boxes, etc. configured to store a plurality of items offered for sale through the fulfillment system. The container storage system 525 may comprise storage apparatuses such as shelves, bins, boxes, etc. configured to store a plurality of used and/or new containers. In some embodiments, the product storage system 527 and/or the container storage system 525 may further comprise a mechanical device such as dispenser and drop chutes for releasing items to the conveyor system 530. In some embodiments, the product storage system 527 and/or the container storage system 525 may comprise the storage system 160 described with reference to FIG. 1 or other similar systems. In some embodiments, the product storage system 527 may be separated from or share space with the container storage system 525. In some embodiments, one or more portions of the conveyor system 530 may be used for temporary container storage. In some embodiments, the backroom area 520 may be referred to as the storage and/or fulfillment area.

The consolidation area 522 may generally refer to an area configured for consolidating products for a customer order. Containers assigned to an order may be carried or transferred over to the consolidation area 522 to package products for orders. In some embodiments, the conveyor system 530 may be configured to directly transfer a used container from the container receptacle 513 to the consolidation area 522 without storing the container in the container storage system 525. In some embodiments, the consolidation area 522 may comprise user interface devices configured to provide order fulfillment and/or container retrieval instructions to associates. In some embodiments, the consolidation area 522 may comprise consolidation stations for associates to place products retrieved from the product storage system 527 into containers retrieved from the container storage system 525 and/or the conveyor system 530. In some embodiments, the consolidation area 522 may comprise a conveyor system configured to at least partially automate the collection of products from the product storage system 527 and the filling of containers. In some embodiments, the consolidation area 522 may be configured to fill containers for one or more of in-store pickup orders, curbside pickup orders, delivery orders, and reoccurring orders.

The sales floor area 510 may comprise an area generally accessible to customers in a retail facility. In some embodiments, the sales floor area 510 may comprise shelves, modular displays, display cases, etc. for displaying products to customers for selection. In some embodiments, the sales floor area 510 may comprise a pickup order area where containers filled with in-store pickup type customer orders may be transferred to and/or stored for customer pickup. In some embodiments, a sales floor area 510 may be absent in the facility 500. For example, the facility 500 may comprise an order fulfillment only facility that do not have a customer shopping area.

The layout of the facility 500 shown in FIG. 5 is provided as an example only. The proportions, positioning, and arrangements of the areas, systems, and devices can generally be varied in a number of ways without departing from the spirit of the present disclosure.

Figure 6:
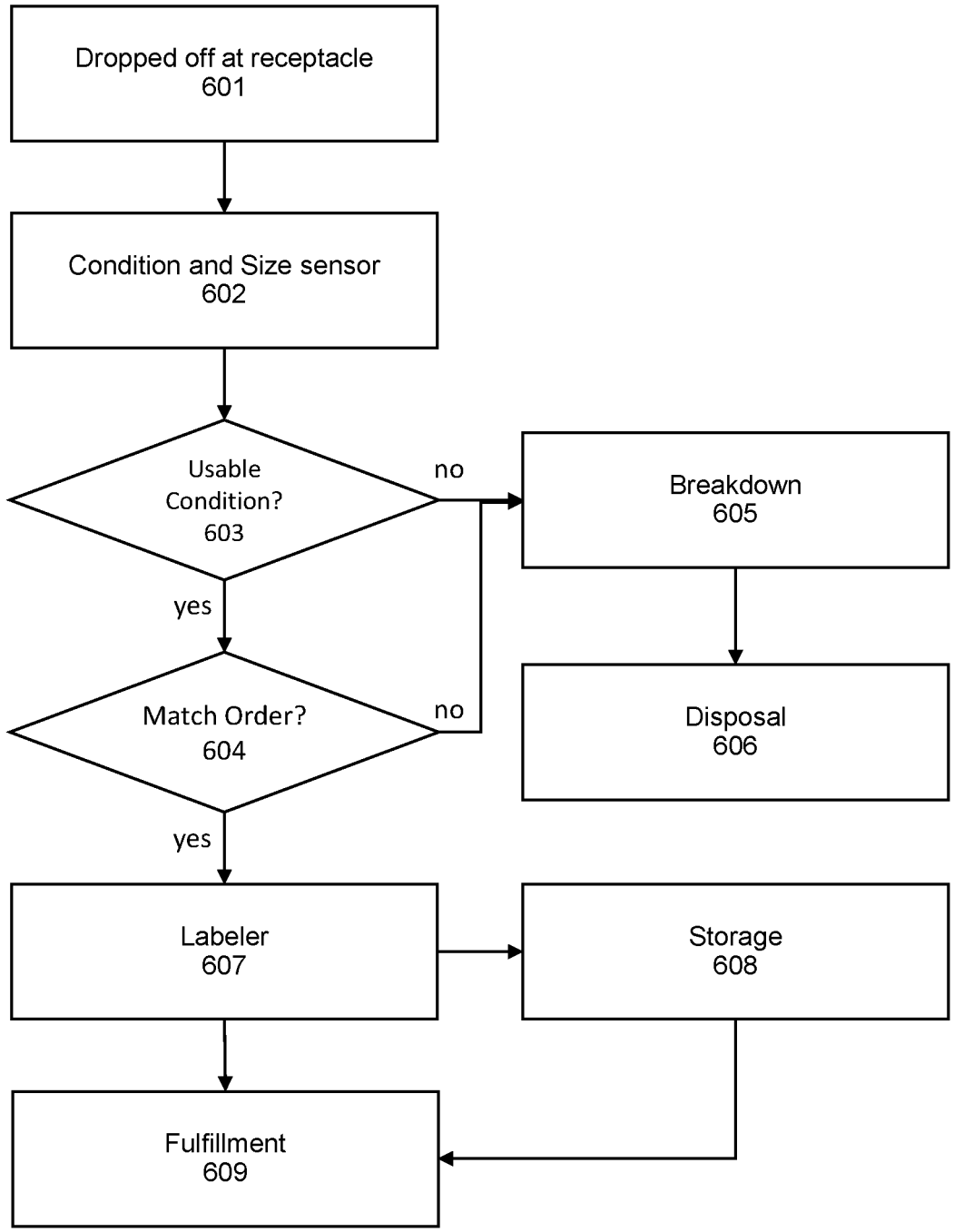
FIG. 6 comprises a flow diagram as configured in accordance with various embodiments of these teachings.

Referring now to FIG. 6, a flow diagram of used container processing is shown. In step 601, a used container is dropped off at a receptacle. In step 602, the container passes through a condition and size sensor of the system to determine the container's dimension and condition. In step 603, the system determines whether the container is in a usable condition. If the container is not reusable, the container is broken down in step 605 and sent to a disposal area in step 606. In some embodiments, the system may further determine whether the container is in a recyclable conditional. A container in a recyclable condition may be routed to recycling in step 606 and a container not in recyclable condition (e.g. heavily soiled, unrecyclable material, etc.) may be routed to a landfill in step 606.

In step 604, the system determines whether the container matches an existing and/or predicted order. In some embodiments, if the order does not match an order in the database and/or is determine to be unlikely to match future orders, the container may be routed to be broken down in step 605. If the container matches an order and/or an expected order, the container may pass through a labeler system in step 607. For a container assigned to a specific order, the order and/or delivery information may be printed on the label. For a container predicted to be useful for a future order, the system may print a container identifier and/or container dimension information on the label.

After step 607, containers being used to fill an order may be routed directly to the fulfillment system in step 609. Containers assigned to a predicted future order or an order scheduled to be filled at a later time may first be sent to the storage system in step 608 before being used for order fulfillment. In some embodiments, each used container dropped off at a container receptacle may be processed through steps 601-609 to determine whether the container will be disposed, stored, and/or used for order fulfillment.

Figure 7:
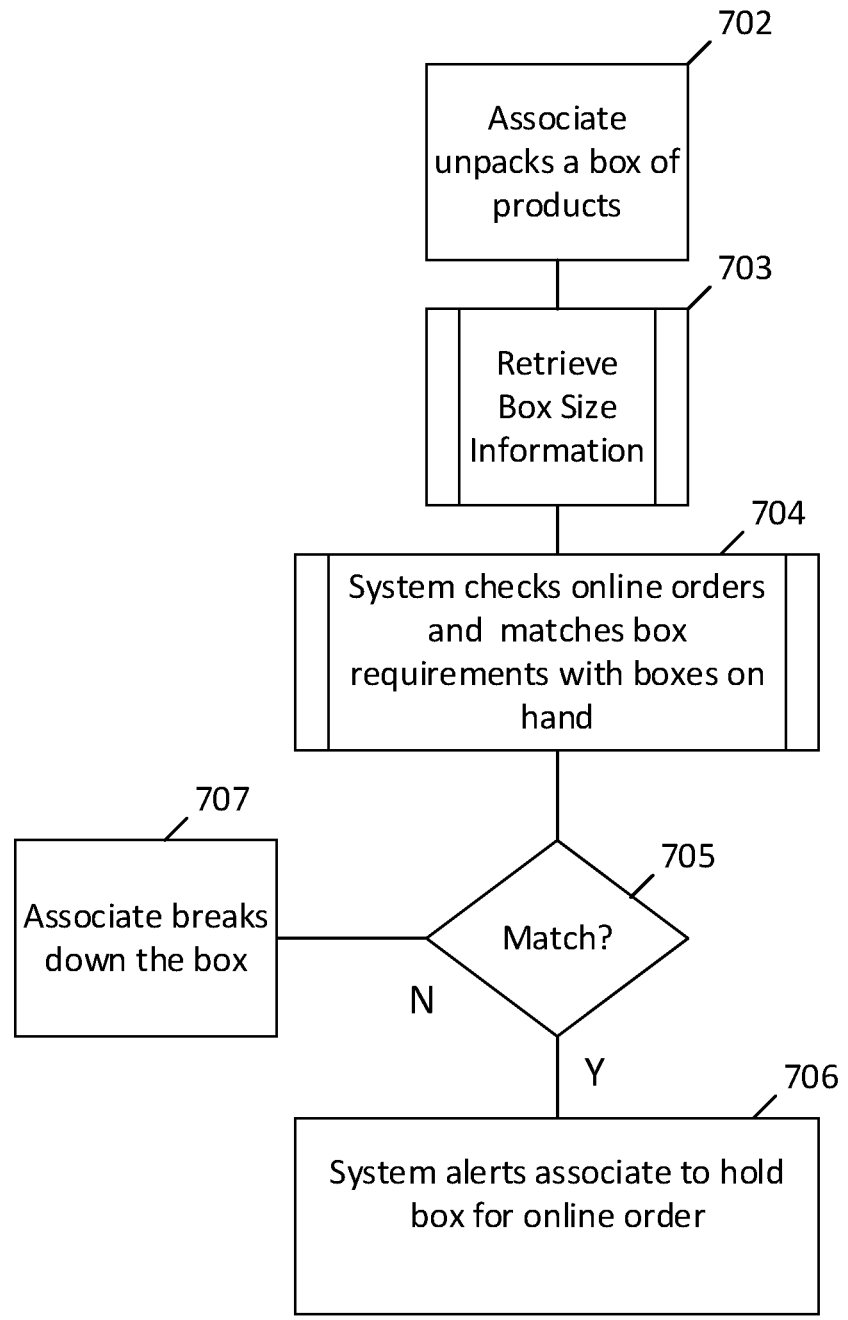
FIG. 7 comprises a flow diagram as configured in accordance with various embodiments of these teachings.

Referring now to FIG. 7, a flow diagram for processing used containers is shown. In some embodiments, the steps shown in FIG. 7 may be performed by a processor-based device such as the control circuit executing a set of computer readable instructions stored on a computer readable memory. In some embodiments, one or more steps of FIG. 7 may be performed by one or more of the control circuit 112 of the central computer system 110, a control circuit of the sensor system 130, the receptacle 140, the conveyor system 150, the storage system 160, and/or the consolidation system 170 described with reference to FIG. 1 herein.

In step 702, a facility associate unpacks a box of products. In some embodiments, the box of products may be shipped from a distributor and/or manufacturer to the facility. In some embodiments, a box may hold a plurality of units of products for sale. In some embodiments, items may be removed from the box to fill a storage system, a sales floor display, and/or one or more customer orders. In step 703, the system retrieves box size information. In some embodiments, the box may be measured by a sensor to obtain size information. In some embodiments, the box size information may be retrieved based on receiving shipment information. For example, the system may store the sizes of shipment container boxes associated with different products and determine the size of an emptied box based on the products removed from the box. In step 704, the system checks online orders and matches box requirements with boxes on hand. In step 705, if a match is found, the system proceeds to step 706 and alerts associates to hold the box to be used for an online order. If no match is found in step 705, the system may proceed to step 707 and instruct an associate to break down the box and send the box for recycling and/or disposal.

In some embodiments, a system is provided to allow customers to donate unbroken boxes at a store facility. The system may be configured to scan the boxes and determines the source (e.g. Amazon, eBay, Buy.com) and size of the boxes. In some embodiments, a conveyor system may be configured to moves the boxes from the front of the store and label the boxes "Recycled" or "Re-Use." The system may also apply a label over any existing barcodes or other markings remaining on the boxes. In some embodiments, the system may alert an associate when the donation area is full and instruct associates to move boxes from the donation area to a storage area.

In some embodiments, the system may comprise a box sorter configured to provide boxes for orders being fulfilled based on the sizes of the items in the order. In some embodiments, the system may be configured to reuse boxes previously utilized to ship products to the store.

In some embodiments, the system may keep track of the sizes of the available boxes stored in the system. The system may also store a record of upcoming orders to be fulfilled. In some embodiments, the system may direct an associate to keep boxes used for shipping products to the store (e.g. hold the box and not flatten it). The system may further direct associates to reuse these boxes for fulfilling customer orders fulfilled from the facility.

In some embodiments, a system for used container intake, comprises a receptacle configured to receive used containers from customers, a sensor system configured to detect dimensions and conditions from containers placed in the receptacle, a used container database, a conveyor system, and a control circuit coupled to the sensor system and the used container database. The control circuit being configured to assign a container identifier to a container detected by the sensor system, measure a container dimension of the container with the sensor system, determine a container condition based on whether the container is suitable for reuse, associate the container dimension with the container identifier in the used container database, and cause the conveyor system to route the container based on the container condition.

In some embodiments, a method for used container intake comprises assigning, with a control circuit, a container identifier to a container detected by a sensor system configured to detect dimensions and conditions from containers placed in a receptacle, the receptacle being configured to receive used containers from customers, measuring a container dimension of the container with the sensor system, determining, with the control circuit, a container condition based on whether the container is suitable for reuse, associating, with the control circuit, the container dimension with the container identifier in a used container database; and causing a conveyor system to route the container based on the container condition.

In some embodiments, an apparatus for used container intake comprises a non-transitory storage medium storing a set of computer readable instructions and a control circuit configured to execute the set of computer readable instructions which causes to the control circuit to: assign a container identifier to a container detected by a sensor system configured to detect dimensions and conditions from containers placed in a receptacle, the receptacle being configured to receive used containers from customers, measuring a container dimension of the container with the sensor system, determining a container condition based on whether the container is suitable for reuse, associate the container dimension with the container identifier in a used container database, and cause a conveyor system to route the container based on the container condition.

In some embodiments, a system for container reuse comprises an order database storing a plurality of orders associated with an order fulfillment facility, a conveyor system, and a control circuit coupled to the order database. The control circuit being configured to determine container capacity requirements of the plurality of orders in the order database based on dimensions of products in each order, predict container usage for fulfilling orders at the order fulfillment facility based at least on the container capacity requirements of the plurality of orders, determine whether a used container received at the conveyor system should be retained based on a container dimension of the used container and the container usage predicted for the order fulfillment facility, and cause the conveyor system to route the used container to a fulfillment area or a disposal area based on whether the used container should be retained.

In some embodiments, a method for container reuse comprises determining, with a control circuit, container capacity requirements of a plurality of orders in an order database based on dimensions of products in each order, the order database storing orders associated with an order fulfillment facility, predicting, with the control circuit, container usage for fulfilling orders at the order fulfillment facility based at least on the container capacity requirements of the plurality of orders, determining, with the control circuit, whether a used container received at a conveyor system should be retained based on a container dimension of the used container and the container usage predicted for the order fulfillment facility, and causing the conveyor system to route the used container to a fulfillment area or a disposal area based on whether the used container should be retained.

In some embodiments, an apparatus for container reuse comprises a non-transitory storage medium storing a set of computer readable instructions, and a control circuit configured to execute the set of computer readable instructions which causes to the control circuit to: determine container capacity requirements of a plurality of orders in an order database based on dimensions of products in each order, the order database storing orders associated with an order fulfillment facility, predict container usage for fulfilling orders at the order fulfillment facility based at least on the container capacity requirements of the plurality of orders, determine whether a used container received at a conveyor system should be retained based on a container dimension of the used container and the container usage predicted for the order fulfillment facility, and cause the conveyor system to route the used container to a fulfillment area or a disposal area based on whether the used container should be retained.

In some embodiments, a system for filling orders comprises an order database storing a plurality of orders, a used container database storing dimensions of a plurality of used containers, and a control circuit coupled to the order database and the used container database. The control circuit being configured to: determine a container requirement of an order in the order database based on dimensions of products in the order, determine whether an available used container in the used container database meets the container requirement of the order, in an event that an used container meets the container requirement of the order, assign the used container to the order, and in an event that no available used container meets the container requirement of the order, select a new container for the order.

In some embodiments, a method for filling orders comprises determining, with a control circuit, a container requirement of an order in an order database based on dimensions of products in the order, determining, with the control circuit, whether an available used container in a used container database meets the container requirement of the order, the used container database storing dimensions of a plurality of used containers, in an event that an used container meets the container requirement, assigning the used container to the order, and in an event that no available used container meets the container requirement of the order, selecting a new container for the order.

In some embodiments, an apparatus for filling orders comprises a non-transitory storage medium storing a set of computer readable instructions, and a control circuit configured to execute the set of computer readable instructions which causes to the control circuit to: determine a container requirement of an order in an order database based on dimension of products in the order, determine whether an available used container in a used container database meets the container requirement of the order, the used container database storing dimensions of a plurality of used containers, in an event that a used container meets the container requirement, assign the used container to the order, and in an event that no available used container meets the container requirement of the order, select a new container for the order.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for container reuse, comprising:
an order database storing a plurality of orders associated with an order fulfillment facility;
a conveyor system;
a sensor system configured to determine dimensions of used containers received at the conveyor system; and
a control circuit coupled to the order database, the control circuit being configured to:
determine container capacity requirements of the plurality of orders in the order database based on dimensions of products in each order;
predict container usage for fulfilling orders at the order fulfillment facility based at least on the container capacity requirements of the plurality of orders;
receive a used container at the conveyor system;
determine, with the sensor system, a container capacity dimension of the used container;
determine whether the used container received at the conveyor system should be retained based on the container capacity dimension of the used container determined based on the sensor system and the container usage predicted for the order fulfillment facility; and cause the conveyor system to route the used container to a fulfillment area or a disposal area of the order fulfillment system based on whether the used container should be retained.

2. The system of claim 1, wherein the container usage for the order fulfillment facility is predicted based on one or more of: the plurality of orders in the order database, a history of past orders, and predicted further orders.

3. The system of claim 1, wherein whether the used container should be retained is determined based on matching the used container to an order in the order database.

4. The system of claim 1, wherein whether the used container should be retained is determined based on past usage rates of containers with dimensions similar to the container capacity dimension of the used container.

5. The system of claim 1, wherein whether the used container should be retained is determined further based on one or more of: current container inventory in a storage of the order fulfillment facility and a current storage capacity of the order fulfillment facility.

6. The system of claim 1, wherein the fulfillment area comprises one or more of a container storage area, a container sorting area, and an order consolidation area.

7. The system of claim 1, wherein the control circuit is further configured to: assign at least some orders in the order database to at least one container routed to the fulfillment area; and determine a storage arrangement for a plurality of containers routed to the fulfillment area based on a fulfillment sequence of orders assigned to each of the plurality of containers.

8. The system of claim 1, wherein the control circuit is further configured to: determine a storage arrangement for a plurality of containers routed to the fulfillment area based on the dimensions of each of the plurality of containers.

9. The system of claim 1, wherein the control circuit is further configured to: select a storage location for the used container; and associate the storage location with a used container identifier associated with the used container in a used container database.

10. The system of claim 1, wherein used containers routed to the fulfillment area remains in an un-collapsed state and wherein used containers routed to the disposal area are broken down for recycling or landfill.

11. A method for container reuse, comprising:
determining, with a control circuit, container capacity requirements of a plurality of orders in an order database based on dimensions of products in each order, the order database storing orders associated with an order fulfillment facility;
predicting, with the control circuit, container usage for fulfilling orders at the order fulfillment facility based at least on the container capacity requirements of the plurality of orders;
receiving a used container at a conveyor system;
determining, with a sensor system configured to determine dimensions of used containers received at the conveyor system, a container capacity dimension of the used container;
determining, with the control circuit, whether the used container received at the conveyor system should be retained based on the container capacity dimension of the used container determined based on the sensor system and the container usage predicted for the order fulfillment facility; and
causing the conveyor system to route the used container to a fulfillment area or a disposal area of the order fulfillment system based on whether the used container should be retained.

12. The method of claim 11, wherein the container usage for the order fulfillment facility is predicted based on one or more of: the plurality of orders in the order database, a history of past orders, and predicted further orders.

13. The method of claim 11, wherein whether the used container should be retained is determined based on matching the used container to an order in the order database.

14. The method of claim 11, wherein whether the used container should be retained is determined based on past usage rates of containers with dimensions similar to the container capacity dimension of the used container.

15. The method of claim 11, wherein whether the used container should be retained is determined further based on one or more of: current container inventory in a storage of the order fulfillment facility and a current storage capacity of the order fulfillment facility.

16. The method of claim 11, wherein the fulfillment area comprises one or more of a container storage area, a container sorting area, and an order consolidation area.

17. The method of claim 11, further comprising: assigning at least some orders in the order database to at least one container routed to the fulfillment area; and determining a storage arrangement for a plurality of containers routed to the fulfillment area based on a fulfillment sequence of orders assigned to each of the plurality of containers.

18. The method of claim 11, further comprising: determining a storage arrangement for a plurality of containers routed to the fulfillment area based on the dimensions of each of the plurality of containers.

19. The method of claim 11, further comprising: selecting a storage location for the used container; and associating the storage location with a used container identifier associated with the used container in a used container database.

20. An apparatus for container reuse, comprising:
a non-transitory storage medium storing a set of computer readable instructions; and
a control circuit configured to execute the set of computer readable instructions which causes to the control circuit to:
determine container capacity requirements of a plurality of orders in an order database based on dimensions of products in each order, the order database storing orders associated with an order fulfillment facility;
predict container usage for fulfilling orders at the order fulfillment facility based at least on the container capacity requirements of the plurality of orders;
receive a used container at a conveyor system;
determine, with a sensor system configured to determine dimensions of used containers received at the conveyor system, a container capacity dimension of the used container;
determine whether the used container received at the conveyor system should be retained based on the container capacity dimension of the used container determined based on the sensor system and the container usage predicted for the order fulfillment facility; and
cause the conveyor system to route the used container to a fulfillment area or a disposal area of the order fulfillment system based on whether the used container should be retained.

* * * * *